(No Model.)

M. DEAN.
ADJUSTABLE LID HOLDER FOR TEA POTS AND OTHER VESSELS.

No. 352,609. Patented Nov. 16, 1886.

Witnesses

Inventor
Meshach Dean.
By his Attorney
Herbert W. T. Jenner.

UNITED STATES PATENT OFFICE.

MESHACH DEAN, OF WOLSTANTON, COUNTY OF STAFFORD, ENGLAND.

ADJUSTABLE LID-HOLDER FOR TEA-POTS AND OTHER VESSELS.

SPECIFICATION forming part of Letters Patent No. 352,609, dated November 16, 1886.

Application filed August 24, 1886. Serial No. 211,721. (No model.) Patented in England January 18, 1886, No. 774.

*To all whom it may concern:*

Be it known that I, MESHACH DEAN, a citizen of Great Britain, residing at Wolstanton, in the county of Stafford, England, have invented certain new and useful Improvements in Adjustable Lid-Holders for Tea-Pots and other Vessels, (English Patent No. 774 of 1886;) and I hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to devices for holding on the lids of tea-pots and other vessels; and it consists in the novel construction of the parts, hereinafter fully described and claimed, by which the lid is prevented from falling off while the liquid is being poured from the vessel.

Figure 1:
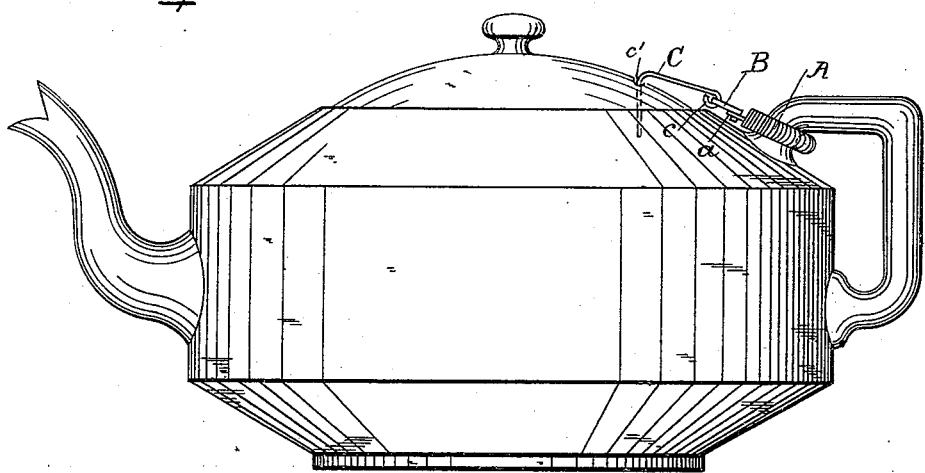
Figure 2:
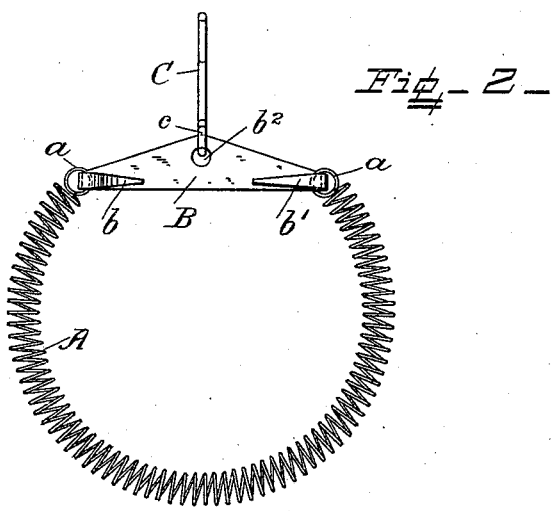

In the drawings, Figure 1 is a side view of a tea-pot having my lid-holder applied to it. Fig. 2 is a plan view from below of the protector.

A is an extensible elastic loop, formed of a helical coil of wire, and provided with an eye, $a$, at each end.

B is a flat bar provided with a hook, $b$, at one end, which is closed upon one of the eyes $a$, and with a similar hook, $b'$, at the opposite end, which engages with the eye $a$ at the opposite end of the loop A. The hook $b'$ is not closed upon the eye, but is left open, so that the eye can be hooked on and off, as required. A hole, $b^2$, is formed in the bar B, between the hooks $b$ and $b'$.

C is a hook provided with a loop, $c$, at one end, which engages with the bar B by passing through the said hole $b^2$.

This device is applicable to all earthenware and china tea-pots which have no hinge for securing the lid to the body, and also to all other vessels of any material which are not provided with hinges.

The loop A is made of sufficient length to go round the handle or other similar part which is permanently secured to the body of the vessel, and the hook C passes through a hole, $c'$, in the lid, and prevents the lid from falling off when liquid is being poured from the vessel.

The end of the hook C can be bent around on the under side of the lid, if desired, so that it may be held firmly. The loop A being elastic and extensible, this device will accommodate itself to vessels of all sizes without alteration.

What I claim is—

1. An extensible elastic loop for attachment to the body of a vessel, in combination with a hook pivotally connected to the said loop, and a lid provided with a hole with which the said hook may engage.

2. An extensible elastic loop formed of a helical coil of wire for attachment to the body of a vessel, in combination with a hook pivotally connected to the said loop, and a lid provided with a hole with which the said hook may engage.

3. The combination of an extensible elastic loop for attachment to the body of a vessel, provided with an eye at each end, a bar provided with hooks engaging with the said eyes, and a hook pivotally connected to the bar for holding the lid.

4. The combination of an extensible elastic loop for attachment to the body of a vessel, provided with an eye at each end, a bar provided with hooks, one of which is permanently secured to one of the said eyes, and the other hook detachably connected to the remaining eye, and a hook pivotally connected to the bar between the aforesaid hooks for holding the lid.

In testimony whereof I affix my signature in presence of two witnesses.

MESHACH DEAN.

Witnesses:
 THOMAS WARD,
 JOHN H. COPESTAKE.